United States Patent
Marcin

(10) Patent No.: US 9,987,679 B2
(45) Date of Patent: Jun. 5, 2018

(54) RAPID TOOLING INSERT MANUFACTURE

(71) Applicant: United Technologies Corporation, Hartford, CT (US)

(72) Inventor: John Joseph Marcin, Marlborough, CT (US)

(73) Assignee: United Technologies Corporation, Farmington, CT (US)

( * ) Notice: Subject to any disclaimer, the term of this patent is extended or adjusted under 35 U.S.C. 154(b) by 208 days.

(21) Appl. No.: 14/501,155

(22) Filed: Sep. 30, 2014

(65) Prior Publication Data

US 2015/0096713 A1    Apr. 9, 2015

Related U.S. Application Data

(60) Provisional application No. 61/887,517, filed on Oct. 7, 2013.

(51) Int. Cl.
| | | |
|---|---|---|
| *B22D 17/22* | (2006.01) | |
| *B29C 67/00* | (2017.01) | |
| *B33Y 80/00* | (2015.01) | |

(52) U.S. Cl.
CPC ......... *B22D 17/22* (2013.01); *B22D 17/2209* (2013.01); *B22D 17/229* (2013.01); *B29C 67/0051* (2013.01); *B33Y 80/00* (2014.12)

(58) Field of Classification Search
CPC ... B22D 17/22; B22D 17/2209; B22D 17/229
USPC .......................................... 164/520, 15, 302
See application file for complete search history.

(56) References Cited

U.S. PATENT DOCUMENTS

| | | | | |
|---|---|---|---|---|
| 5,458,825 A | * | 10/1995 | Grolman et al. | ... B29C 33/3842 264/225 |
| 5,609,922 A | * | 3/1997 | McDonald | ................ B22C 9/04 249/114.1 |
| 5,937,265 A | * | 8/1999 | Pratt et al. | ............ B22F 3/1258 419/42 |
| 6,153,312 A | * | 11/2000 | Schmidt et al. | ........ B22F 5/007 249/134 |
| 6,179,039 B1 | * | 1/2001 | Grinberg et al. | ....... C23C 4/185 164/4.1 |
| 6,408,734 B1 | * | 6/2002 | Cohen | ..................... F41H 5/023 89/36.02 |
| 6,484,790 B1 | * | 11/2002 | Myers et al. | .......... B22D 19/08 164/100 |
| 6,637,500 B2 | | 10/2003 | Shah et al. | |
| 7,334,625 B2 | | 2/2008 | Judge et al. | |
| 7,829,000 B2 | * | 11/2010 | Farr et al. | ........... B29C 67/0081 264/113 |
| 8,251,123 B2 | | 8/2012 | Farris et al. | |
| 8,356,655 B2 | | 1/2013 | Bochiechio et al. | |
| 2002/0187065 A1 | * | 12/2002 | Amaya et al. | .......... B22F 3/225 419/8 |
| 2012/0244344 A1 | * | 9/2012 | Tenold et al. | .......... B22D 19/14 428/337 |
| 2013/0195675 A1 | | 8/2013 | Gleiner et al. | |
| 2013/0220571 A1 | | 8/2013 | Mueller et al. | |

* cited by examiner

*Primary Examiner* — Kevin P Kerns

(74) *Attorney, Agent, or Firm* — Carlson, Gaskey & Olds, P.C.

(57) ABSTRACT

A method of fabricating a die cast article is disclosed and includes forming an insert with an additive manufacturing process to define a cavity for generating desired part geometry. The insert is then mounted within a mold tool, material is injected into the cavity to fill the cavity and form a cast article.

13 Claims, 1 Drawing Sheet

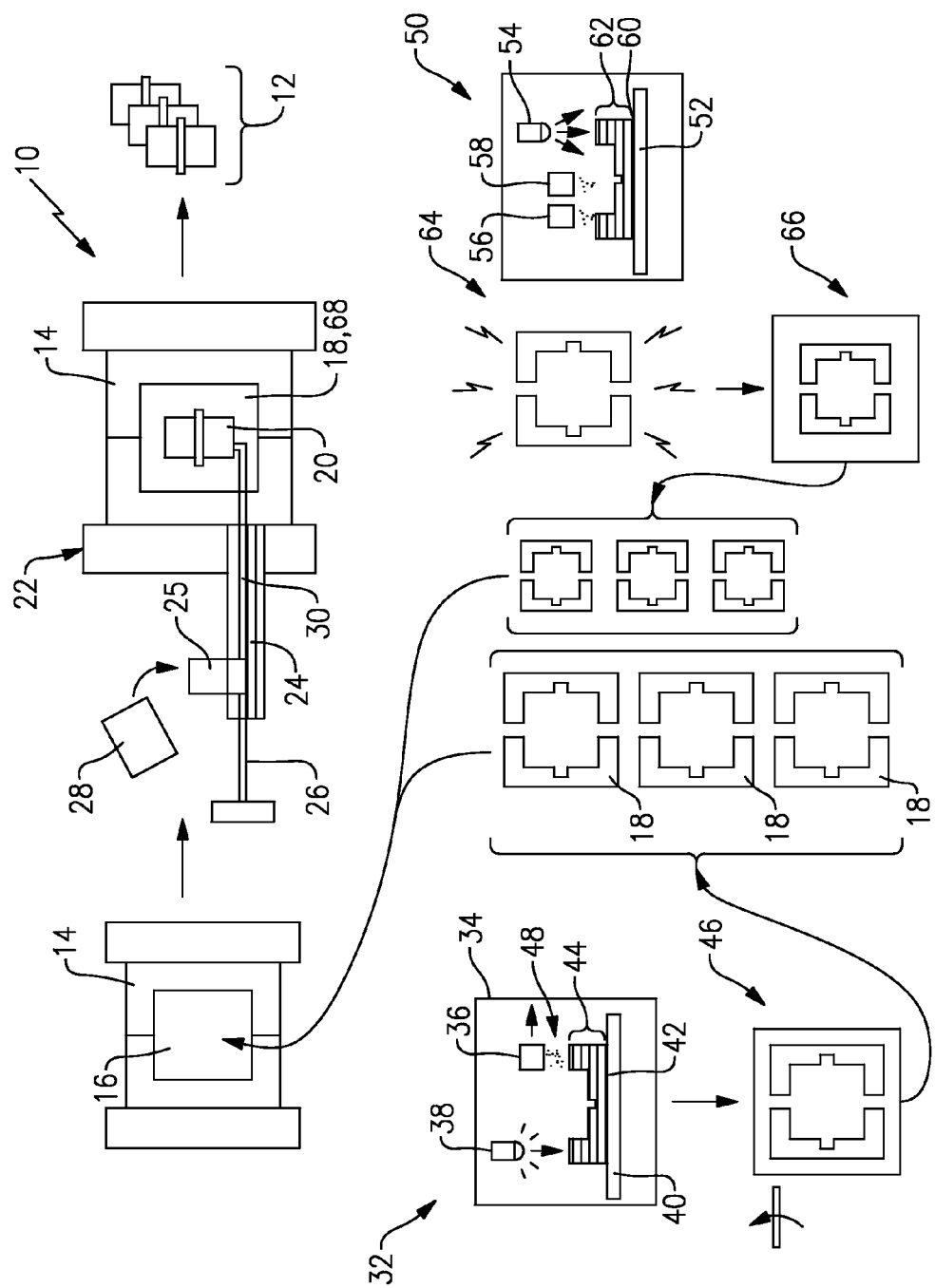

RAPID TOOLING INSERT MANUFACTURE

CROSS REFERENCE TO RELATED APPLICATION

This application claims priority to U.S. Provisional Application No. 61/887,517 filed on Oct. 7, 2013.

BACKGROUND

A die casting process produces a cast article by injecting molten metal into a cavity and holding the molten metal under pressure during curing and solidification. The cast tool that defines the cavity for the part is constructed of a material having a higher melting temperature than that of the material that is injected into the cavity to form the cast article. Typical die cast operations utilize low melting temperature molten material and therefore do not require that are constructed of materials with unusually high melting temperatures. However, when high melting temperature alloys, such as nickel alloys are utilized for fabricating the cast article, the mold must be fabricated from materials capable of operating at the higher temperatures. As appreciated, higher temperature capable materials increase costs.

Accordingly, in many instances, an insert is mounted within the mold to form and define the desired part cavity geometry. The insert mounted within the mold is fabricated from a material compatible with the required molding temperatures and material. The surrounding mold is fabricated from less costly and lower temperature capable material. After a defined number of cycles, the insert is replaced such that dimensional capability and mold performance are maintained within desired limits.

However, even utilizing a mold insert to reduce the amount of higher temperature capable material required, the associated costs and time to manufacture the inserts may make use of the die casting process impractical for production. Accordingly, it is desirable to develop and design a process for fabricating high melting temperature die cast molding inserts that makes such a process feasible for production of cast articles in desired quantities.

SUMMARY

A method of fabricating a die cast article according to an exemplary embodiment of this disclosure, among other possible things includes forming an insert with an additive manufacturing process to define a cavity for generating a desired part geometry, mounting the insert within a mold tool, injecting a material into the cavity defined by the insert to fill the cavity and form a cast article, and removing the cast article from the cavity.

In a further embodiment of the above method of fabricating a die cast article includes forming the insert by forming a base layer followed by the formation of subsequent layers formed onto the base layer to define the cavity for generating the desired part geometry.

In a further embodiment of any of the above, the base layer and the subsequent layers are formed from a metal material with a melting temperature greater than about 2000° F. (1093° C.).

In a further embodiment of the above method of fabricating a die cast article includes an energy device for generating a molten pool of material between the base layer and subsequent layers applied over the base layer.

In a further embodiment of any of the above, the additive manufacture process forms a pre-ceramic polymer insert, and includes the step of pyrolizing the pre-ceramic polymer insert to form a ceramic insert.

In a further embodiment of any of the above, the insert is formed from an alloy having a melting temperature greater than about 2000° F. (1093° C.).

In a further embodiment of any of the above, the insert is formed from a ceramic composite.

In a further embodiment of the above method of fabricating a die cast article includes removing the insert from the mold tool after a predetermined number of molding cycles and replacing the insert with another insert formed with the additive manufacturing process.

A method of building a molding tool for die cast forming a cast article from a high melting temperature material according to an exemplary embodiment of this disclosure, among other possible things includes forming an insert mountable within a mold tool. The insert is formed utilizing an additive manufacture process with a material having a melting temperature greater than the melting temperature of the material utilized to form the cast article. The insert is mounted within the mold tool to define a part cavity.

In a further embodiment of any of the above, the additive manufacture process includes defining a base layer of a material and adding subsequent layers onto the base layer until the desired insert geometry is complete.

In a further embodiment of any of the above, the additive manufacture process comprises directing energy from an energy emitting device within a work space to bond subsequent layers of material to each other to form the desired insert geometry.

In a further embodiment of any of the above, a high melting temperature material is utilized to form the insert with the additive manufacture process.

In a further embodiment of any of the above, the high melting temperature material comprises a metal alloy.

In a further embodiment of any of the above, the high melting temperature material comprises a ceramic material.

A die casting machine according to an exemplary embodiment of this disclosure, among other possible things includes a mold tool including a first material with a first melting temperature, an insert mounted within the mold tool and defining a cavity for forming a cast article. The insert is formed from material having a second melting temperature equal to or greater than the first melting temperature. An injection system for injecting molten material into the cavity is included.

In a further embodiment of any of the above, the insert comprises a plurality of layers of material bonded to each other forming a single continuous insert.

In a further embodiment of any of the above, the insert comprises a high melting temperature metal alloy.

In a further embodiment of any of the above, the insert comprises a ceramic material.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 1 is a schematic representation of an example method of die casting that utilizes inserts fabricated with an additive manufacturing process.

DETAILED DESCRIPTION

Referring to FIG. 1, an example die casting process 10 is schematically shown and utilized to produce cast articles indicated at 12. In this example, the cast articles 12 are fabricated from high temperature alloys and other high melting temperature materials for use in high temperature environments such as within a turbine section of a gas turbine engine. In this example the cast articles 12 comprise turbine blades utilized within a gas turbine engine.

A die casting machine 22 supports a mold 14 that includes at least two parts to allow for opening and closing for extracting a completed cast article 12. The mold 14 includes a cavity 16 for receiving an insert 18. A shot tube 24 is in communication with a cavity 20 defined by the insert 18 supported within the mold 14. The shot tube 24 includes an opening 25 through which molten material 28 can be communicated to the channel 30. The channel 30 communicates the molten material 28 into the cavity 20. A plunger 26 operates to push molten material 28 through the shot tube 24 and into the cavity 20. The plunger 26 is also utilized to hold the molten material 28 within the cavity 20 at a desired pressure for a desired time for curing and solidification of the completed cast article 12 as well as potential cross-contamination of elements.

During the die casting operation, the insert 18 is supported within the mold 14 and defines the cavity 20 which, in turn, defines the desired part geometry of the completed cast article 12. During operation of the die casting machine 22, the insert 18 will wear due to the material properties utilized in the molten material 28. Wearing of the insert 18 will result in undesired geometric and dimensional variations of the completed cast articles 12. Accordingly, the insert 18 is periodically replaced with identical inserts to maintain the dimension in geometric parameters of the completed cast articles 12.

In the disclosed method, because the molten material 28 is of a composition with a high melting temperature, the material utilized for fabricating the insert 18 also must have a correspondingly and compatible high melting temperature. The higher melting temperatures are required in order to provide a desired number of casting cycles that enable the practical use of a die casting process for fabrication of the cast articles 12 from higher melting temperature materials such as nickel based alloys, (More material examples for the cast article) and other known high temperature materials. Typically, the melting temperatures for such high temperature materials are greater than about 2000° F. (1093° C.).

The example inserts 18 are constructed by way of an additive manufacturing process or solid freeform fabrication method. An additive manufacturing process adds material by layers for forming a desired part geometry and configuration. The additive process can be utilized to form articles from metal alloys along with ceramic materials.

One example additive manufacturing process is schematically shown at 32 and utilizes an additive manufacturing machine 34 that includes a base 40, a material depositor 36 and an energy directing device 38. Material is added to build the part layer by layer. In this example, a base layer 42 is initially formed on the base 40 and additional layers 44 are added to and built up from that base layer 42. The example additive manufacturing process 32 utilizes a metal material 48 deposited in a powder form along the base 40 and over the subsequent layers 44.

An energy directing device 38 directs energy that sweeps across the powder material to melt and bond material in the top layer to those layers previously formed. The energy directing device 38 moves within the workspace of the machine 34 to form the outline and geometry of the desired article. In this example, the energy directing device is a laser beam or an electron beam that directs energy onto the layers of powder material to melt and form the bond with previous layers. Once the energy directing device moves 38 moves on, the molten material solidifies to form a unitary structure.

Accordingly, the example additive manufacturing process 32 provides for rapid formation of desired part geometry. In this example, the material 48 is a nickel based super alloy of a melting temperature that is greater than a melting temperature of the material utilized and intended for the completed cast article 12.

It should be understood that although example additive manufacturing processes are disclosed, it is within the contemplation of this disclosure to utilize any solid free form additive manufacturing process including powder deposition, laser based systems, electron beam, and other known additive manufacturing processes.

The insert may also be formed from a material with a high enough conductivity to enable rapid extraction of heat or of a material with a sufficient thermal barrier capability as to isolate heat from the insert material and die 14. Moreover, multiple layers of different materials can be fabricated of alloy with different propertied of the insert, such as for example, a high conductive external layer with a high temperature capable under layer.

The example insert 18 is therefore formed in the additive manufacturing process 32 and then removed from the additive manufacturing machine 34. The insert 18 may then be further processed with finishing operations schematically indicated at 46. The finishing operations 46 can include simply an inspection to confirm dimensions and geometry or may include finish machining of specific dimensions to provide compatibility with the mold tool 14. Moreover, other finishing operations 46 as are known in the art and required to define the dimensions and geometry of the insert 18 are within the contemplation of this disclosure.

A number of inserts 18 are formed and maintained on-site such that they may be installed into the mold tool 14 to provide the desired switching out of inserts 18 during production of the cast articles 12.

Another additive manufacturing process is schematically shown at 50 for producing an insert 68 formed from a monolithic ceramic material. In this example, the additive manufacturing process 50 utilizes a material depositor 56 to deposit a ceramic material and a resin or binder depositor 58 that follows and deposits material onto a base 52. A base layer 60 is then formed and subsequent layers 62 of ceramic material along with resin or other binding compositions as are known are at least partially solidified by energy directing device indicated at 54. The resulting part fabricated by the additive manufacturing process 50 is of a pre-ceramic polymer material 64 and undergoes a pyrolysis operation indicated at 64 to transform the pre-ceramic polymers into a ceramic material and a completed insert 68.

Once the insert 68 has been transformed to a ceramic material, additional finishing processes as is generally indicated at 66 are performed to provide the final desired dimensional and geometric characteristics. In this example, a plurality of the inserts 68 are formed and maintained available for use in the die casting operation. The inserts 68 are periodically changed to maintain dimensional and geometric features of the completed cast articles 12.

As appreciated, although the example schematic illustration of the disclosed method 10 shows both the inserts 18 and 68 fitting into a common mold 14 that different mold 14 geometries or structures may be required for use of the different inserts. For example the insert 68 formed of a ceramic composite material may require different supporting structures within the mold 14 than the inserts 18 constructed of a high temperature alloy material. Moreover, although the mold tool 14 is illustrated as supporting only a single insert 18, 68, it may be constructed to hold multiple inserts 18, 68 to improve production efficiencies.

Moreover, although specific examples of additive manufacturing processes are disclosed, it is within the contemplation of this disclosure to utilize other additive manufacturing processes as are known for fabrication of the mold inserts 18, 68.

The rapid manufacture of inserts by either of the methods 32 and 50 provide for the rapid fabrication of inserts that allow the practical application of die casting of cast articles 12 from high melting temperature materials such as nickel based super alloys and other materials that require a mold tool or cavity capable of withstanding extreme high temperatures.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A method of fabricating a die cast article comprising:
    forming an insert at a location separate from a mold tool with an additive manufacturing process to define a cavity for generating a desired part geometry, wherein the additive manufacturing process includes forming the insert by using an energy directing device to direct energy across a preplaced powder material to generate a molten pool of material that subsequently cools to form a solid base layer followed by formation of subsequent layers formed on the solid base layer to define an outer surface and cavity of the insert;
    mounting the insert within the mold tool;
    injecting a material into the cavity defined by the insert to fill the cavity and form a cast article; and
    removing the cast article from the cavity of the insert.

2. The method as recited in claim 1, including forming the insert by forming a base layer followed by formation of subsequent layers formed onto the base layer to define the cavity for generating the desired part geometry.

3. The method as recited in claim 2, wherein the base layer and the subsequent layers are formed from a metal material with a melting temperature greater than about 2000° F. (1093° C.).

4. The method as recited in claim 2, including an energy device for generating a molten pool of material between the base layer and subsequent layers applied over the base layer.

5. The method as recited in claim 2, wherein the additive manufacturing process forms a pre-ceramic polymer insert, and including the step of pyrolizing the pre-ceramic polymer insert to form a ceramic insert.

6. The method as recited in claim 1, wherein the insert is formed from an alloy having a melting temperature greater than about 2000° F. (1093° C.).

7. The method as recited in claim 1, wherein the insert is formed from a ceramic composite.

8. The method as recited in claim 1, including removing the insert from the mold tool after a predetermined number of molding cycles and replacing the insert with another insert formed with the additive manufacturing process.

9. A method of building a mold tool for die cast forming a cast article from a high melting temperature material comprising;
    forming an insert mountable within a mold tool, wherein the insert is formed at a location separate from the mold tool utilizing an additive manufacturing process with a material having a melting temperature greater than the melting temperature of the material utilized to form the cast article, wherein the additive manufacturing process includes forming the insert by using an energy directing device to direct energy across a preplaced powder material to generate a molten pool of material that subsequently cools to form a solid base layer followed by formation of subsequent layers formed on the solid base layer to define an outer surface and cavity of the insert; and
    mounting the insert within the mold tool to define a geometry of a cast article.

10. The method as recited in claim 9, wherein the additive manufacturing process comprises defining a base layer of a material and adding subsequent layers onto the base layer until the desired insert geometry is complete.

11. The method as recited in wherein a high melting temperature material is utilized to form the insert with the additive manufacturing process.

12. The method as recited in claim 11, wherein the high melting temperature material comprises a metal alloy.

13. The method as recited in claim 11, wherein the high melting temperature material comprises a ceramic material.

* * * * *

UNITED STATES PATENT AND TRADEMARK OFFICE
CERTIFICATE OF CORRECTION

PATENT NO. : 9,987,679 B2
APPLICATION NO. : 14/501155
DATED : June 5, 2018
INVENTOR(S) : John Joseph Marcin Page 1 of 1

It is certified that error appears in the above-identified patent and that said Letters Patent is hereby corrected as shown below:

In the Claims

Claim 11, Column 6, Line 43; replace "as recited in wherein" with --as recited in claim 10, wherein--

Signed and Sealed this
Eleventh Day of January, 2022

Drew Hirshfeld
*Performing the Functions and Duties of the
Under Secretary of Commerce for Intellectual Property and
Director of the United States Patent and Trademark Office*